UNITED STATES PATENT OFFICE.

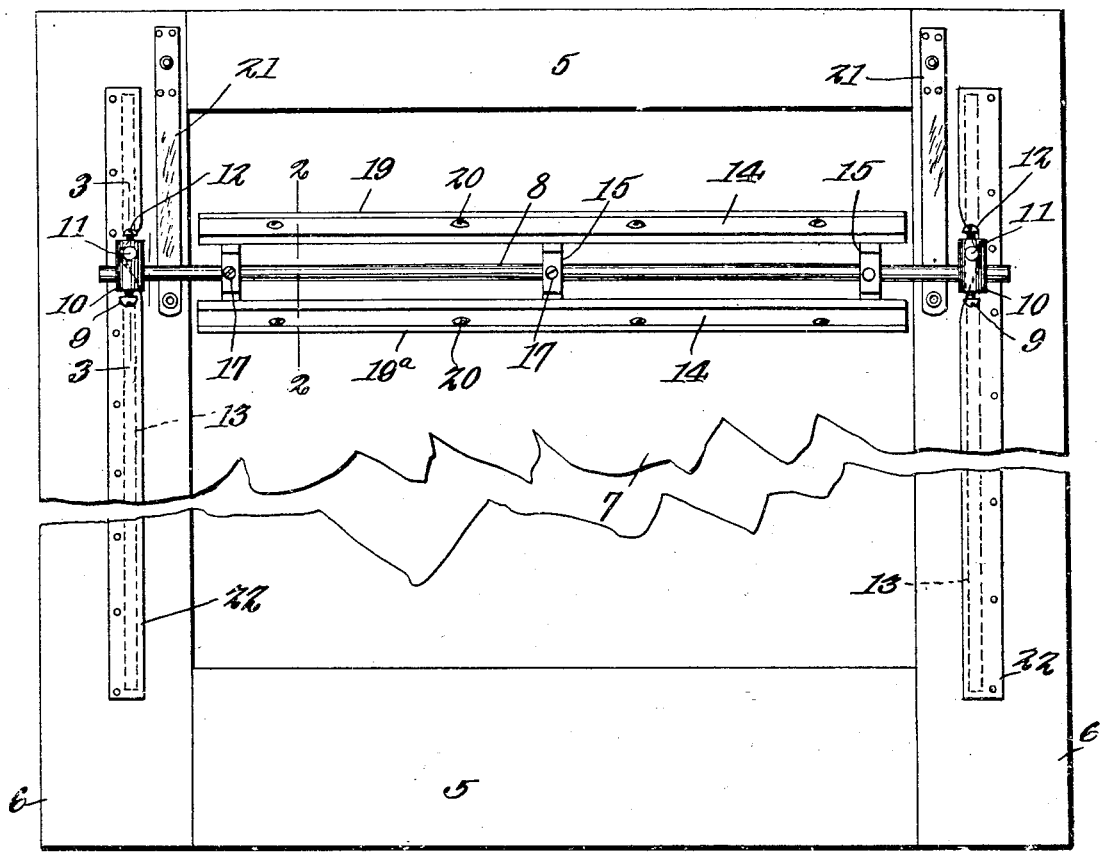
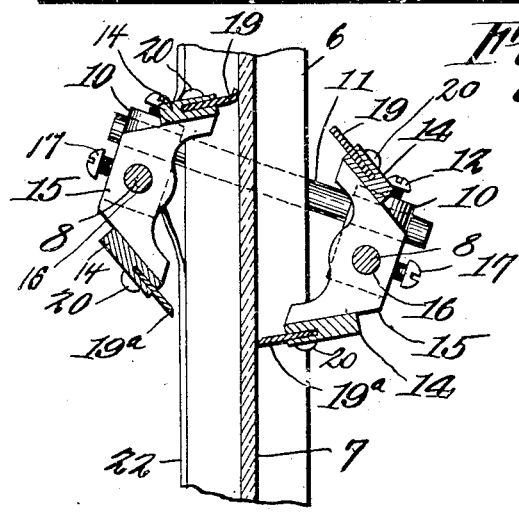
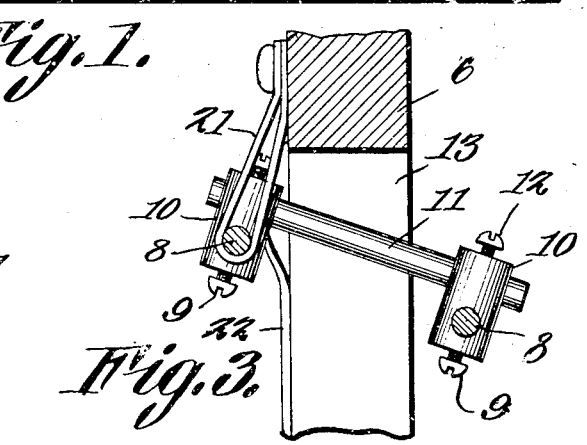

JAMES P. SMITH, OF CHICAGO, ILLINOIS.

WINDOW-CLEANER.

1,197,868.  Specification of Letters Patent.  Patented Sept. 12, 1916.

Application filed March 27, 1916. Serial No. 86,978.

*To all whom it may concern:*

Be it known that I, JAMES P. SMITH, a citizen of the United States, residing at Chicago, in the county of Cook and State of Illinois, have invented new and useful Improvements in Window-Cleaners, of which the following is a specification.

This invention relates to devices for cleaning the windows of street and other car vestibules, so as to afford a clear view through the same.

The invention has for its object to provide a cleaner of the kind stated which is simple in construction, and which can be readily applied to the window frame, and also to provide a window cleaner which is efficient and easily operated.

The invention also has for its object to provide a device for removing snow and ice from the window pane.

The objects stated are attained by means of a novel combination and arrangement of parts to be hereinafter described and claimed, and in order that the same may be better understood, reference is had to the accompanying drawing, forming a part of this specification.

In the drawing, Figure 1 is a front elevation showing the application of the invention, and Figs. 2 and 3 are vertical sectional views on the lines 2—2 and 3—3, respectively, of Fig. 1.

Referring specifically to the drawing, 5 denotes the top and bottom bars, and 6 the side bars of the window frame. The pane is shown at 7. This window structure is located in the vestibule of the car occupied by the motorman, and in order that the motorman may clean the window pane 7 without leaving the vestibule, the following device has been provided:

At 8 are indicated two long rods positioned in parallelism and horizontally spaced relation. The ends of these rods are adjustably secured by set screws 9 in blocks 10. Each pair of these blocks is joined by a cross rod 11, located slightly above the rods 8 and held to the blocks by set screws 12. When applied to the window frame, the rods 11 pass through and seat slidably in vertical slots 13 in the side bars 6, the rods 8 being situated on opposite sides of the pane 7.

On each rod 8 is mounted a cleaning unit comprising the following parts: Two long strips 14 are secured in parallel and spaced relation by spacer blocks 15, said blocks being bored midway between their ends, as indicated at 16, to take the rod 8, and they are fixed on said rod by set screws 17. The strips 14 are divergingly arranged, and their outer edges are recessed to hold a rubber squeegee or wiper strip 19, and a metal scraper strip $19^a$, respectively, said strips being secured by screws 20. The length of the wiper and scraper strips is such that they extend throughout substantially the entire width of the pane 7.

A cleaning unit as hereinbefore described is mounted on each side of the pane 7 so that both sides thereof may be cleaned.

In operation, upon taking hold of the rod 8 which is inside the vestibule, the device may be tilted so that the wiper 19 on the inside of the window comes in contact with the corresponding side of the pane 7, and the device is then drawn down to wipe the pane. The device may also be tilted to bring the scraper $19^a$ in contact with the pane simultaneously with the wiper 19, the latter being at the top, so that the scrapings may be wiped off. If the outside of the pane is to be cleaned, the device is grasped and manipulated to bring the outside wiper or the scraper, or both, into operative position.

When the device is not in use, it will be left at the top of the window, where it may be held by straps 21 or any other suitable supporting means.

The slots 13 are covered by leather or other flexible strips 22 to exclude drafts, said strips being left free at one of their edges so as not to interfere with the movement of the rods 11 in the slots.

I claim:

1. A window cleaner comprising slidable and tiltable members, cross rods connecting the outer ends of said members, blocks fixed on said cross rods in spaced relation, cross strips secured in vertically spaced relation by the blocks and divergingly arranged, and cleaner strips carried by said cross strips.

2. A window cleaner comprising slidable and tiltable rods, blocks secured to the outer ends of the rods, cross rods adjustably connected to the blocks, blocks fixed on said cross rods in spaced relation, cross strips secured in vertically spaced relation by the blocks and divergingly arranged, and cleaner strips carried by said cross strips.

In testimony whereof I affix my signature.

JAMES P. SMITH.